Figure 5:
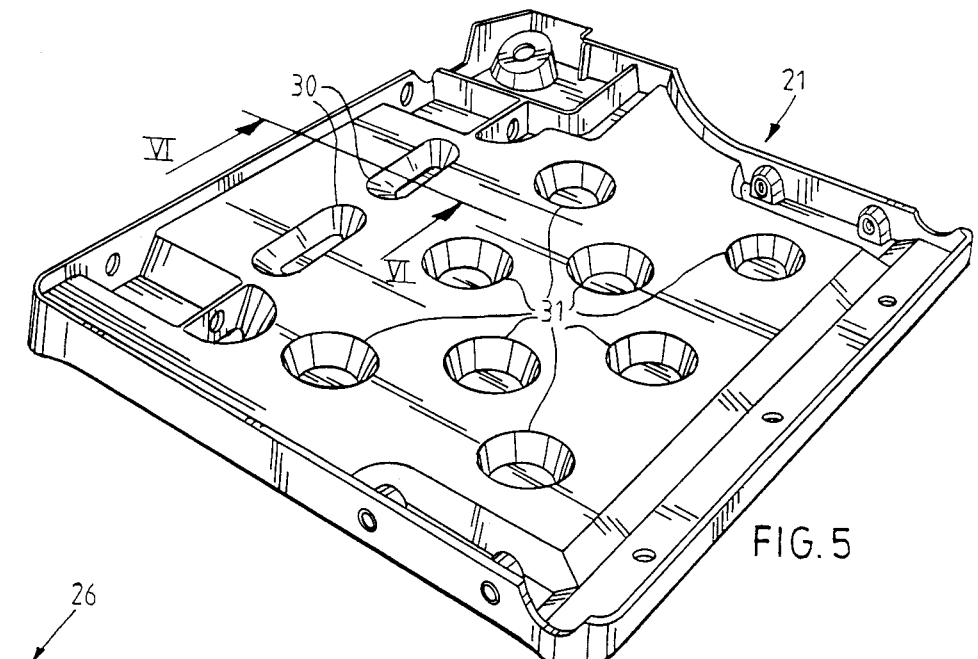

United States Patent [19]

Jaklofsky

[11] Patent Number: 4,849,277

[45] Date of Patent: Jul. 18, 1989

[54] METHOD FOR MANUFACTURING A PANEL

[75] Inventor: Eduard L. Jaklofsky, Soest, Netherlands

[73] Assignee: Polynorm NV, Netherlands

[21] Appl. No.: 77,182

[22] Filed: Jul. 21, 1987

[30] Foreign Application Priority Data

Jul. 21, 1986 [NL] Netherlands .......................... 8601890

[51] Int. Cl.⁴ .............................................. B32B 3/10
[52] U.S. Cl. ................... 428/139; 156/213; 156/252; 428/71; 428/140; 428/159; 428/198
[58] Field of Search .................. 156/213, 252; 428/71, 428/81, 139, 140, 157, 158, 159, 160, 161, 162, 198

[56] References Cited

U.S. PATENT DOCUMENTS

| | | | |
|---|---|---|---|
| 3,003,576 | 10/1961 | Dodge | 428/316.6 |
| 3,528,866 | 9/1970 | Stevens | 428/71 |
| 3,684,633 | 8/1972 | Haase | 428/192 |
| 3,795,722 | 3/1974 | Sassaman | 428/71 |
| 4,432,822 | 2/1984 | Adams et al. | 156/252 |

*Primary Examiner*—William J. Van Balen
*Attorney, Agent, or Firm*—John P. Snyder

[57] ABSTRACT

The invention relates to a method for manufacturing a panel (1, 21, 70, 71), for example an automobile panel such as a reclining backrest, loading floor, roof, door, engine hood, trunk lid and the like, which is characterized in that a prefabricated filling (5, 45) of foam plastic is placed in a mold cavity (59) between two layers (3, 4; 63, 64) of reinforced plastic, and that in a pressing process using heat and pressure said two layers of reinforced plastic are fused to each other while they enclose the foam plastic; and preferably the filling (5, 45) of foam plastic has at least one passage (10, 30, 31, 68), and that during the pressing process both the layers (3, 4; 63, 64) of reinforced plastic are fused to each other at the location of the passage (10, 30, 31, 68).

And further the invention relates to a panel manufactured under application of the method.

10 Claims, 3 Drawing Sheets

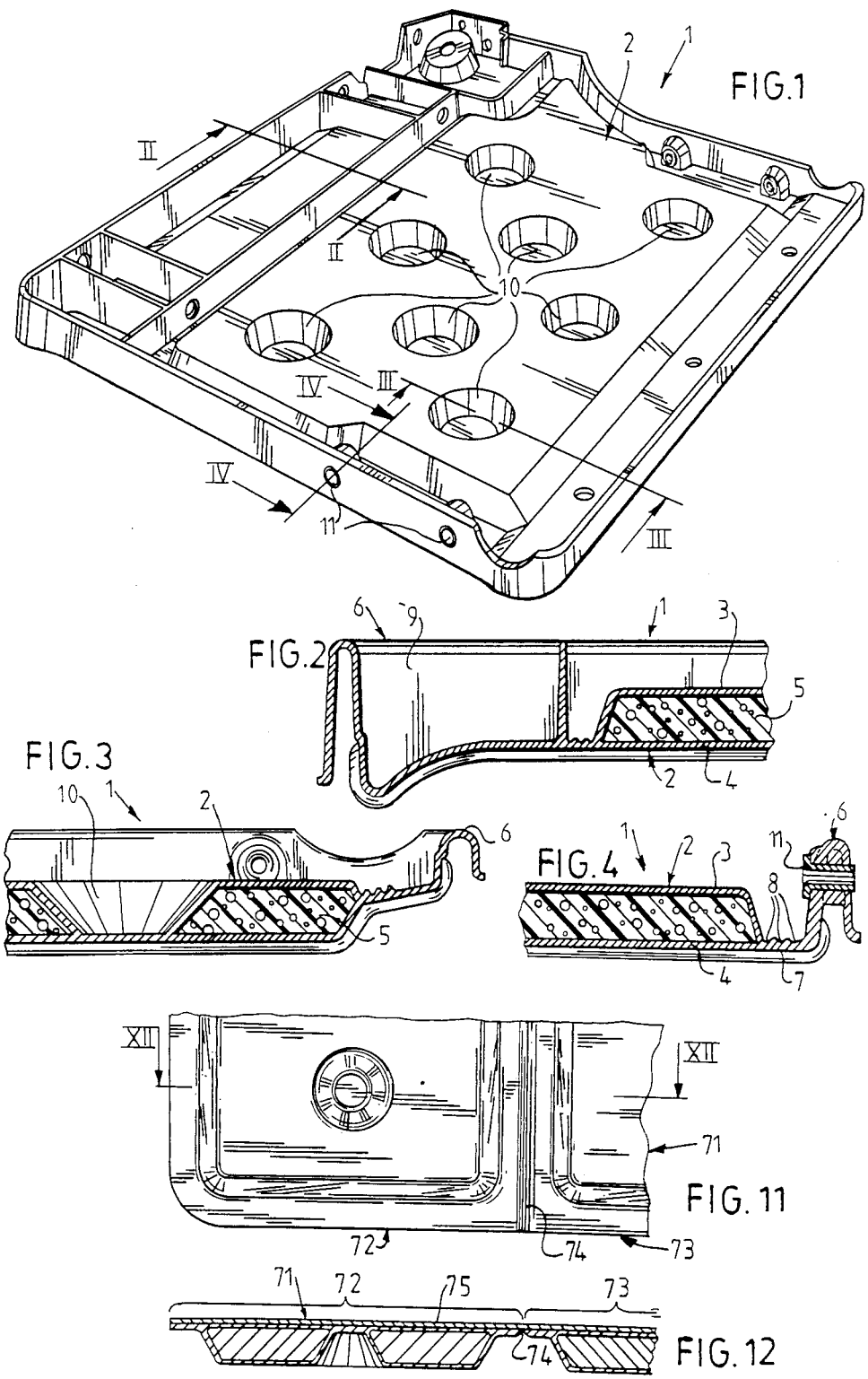

METHOD FOR MANUFACTURING A PANEL

The invention relates to a method for manufacturing a panel, for example an automobile panel such as a reclining backrest, loading floor, roof, door, engine hood, trunk lid and the like.

FR-A-2,010,299 discloses a method of manufacturing a reinforced object. A foam of for instance polystyrene is impregnated with a solution consisting of polystyrene dissolved in styrene, and the reinforcing material is impregnated with this solution containing dissolved polystyrene foam. After partial or complete evaporation of the solvent, the reinforced object is formed in a mold using heat and pressure. The use and notably the evaporation of volatile solvents involves labour hazards and high installation costs for removing and recycling solvent vapours.

The invention has for its object the easy manufacture of a panel that is light in weight. The method according to the invention has for this purpose a prefabricated filling of foam plastic in a mold cavity between two layers of reinforced plastic, the two layers of reinforced plastic fusing to each other in accordance with a pressing process using heat and pressure, while enclosing the foam plastic.

An excellent panel that is particularly serviceable for an automobile is obtained if a covering, for example of textile, is arranged in the mold cavity on the outer side of at least one of both layers of reinforced plastic and is molded on during the pressing process.

An extra strength of the panel is achieved if the filling of foam plastic has at least one passage, if during the pressing process both the layers of reinforced plastic are fused to each other at the location of the passage, and particularly if a plurality of passages are arranged distributed over the surface of the filling and both the layers are fused to each other at each of these locations.

If there is at least one groove present between the filling of foam plastic and a foam plastic-free edge of the panel and the pressure applied on the foam plastic-free edge is greater than on the inside of this groove, a profiled edge for example can on the one hand be formed using the required considerable pressure, while on the other hand excessive penetration of plastic into the foam plastic is prevented.

A panel having a metal insert element can also be manufactured easily according to the invention. This is then molded on during the pressing process. Positioning of the metal insert element in the mold can be performed easily is at least one metal insert element is molded on during fabrication of the filling of foam plastic.

Resins suitable for use as reinforced plastics are:
1. thermoplastic resins
polyalkylenes, such as polypropylene, polyethylene;
terephtalates, such as polybutadiene terephtalate;
polyphenylene oxides (PPO);
polyether imides (PEI);
polyether ether ketones (PEEK);
2. Thermosetting resins
polyesters, phenol resins, melamine resins.
Suitable reinforcing materials are fibrous products of glass, aramides, carbon and the like. Suitable closed cell foam plastics comprise the thermoplastic resins PPO, polystyrene and PEI; and as thermosetting resin for instance polyurethane.

Mentioned and other characteristics of the method according to the invention will be elucidated in the description following hereinafter with reference to a drawing.

Figure 6:
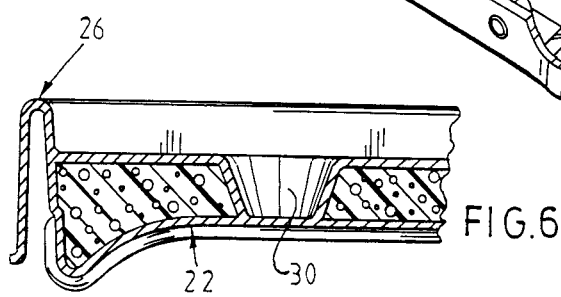
Figure 7:
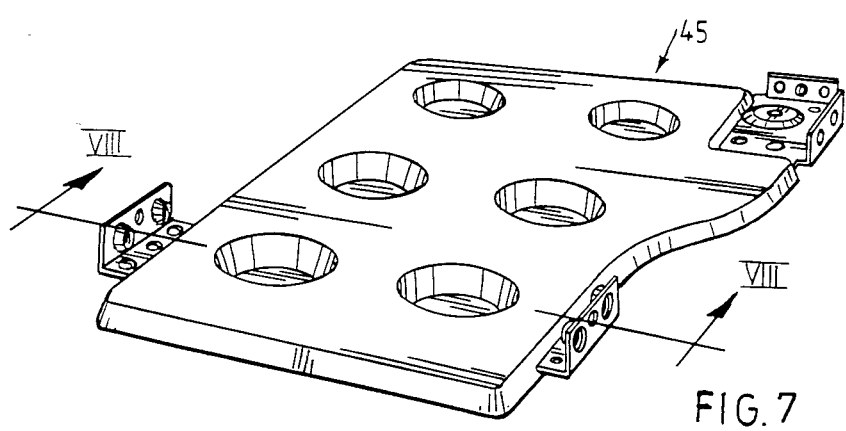
Figure 8:
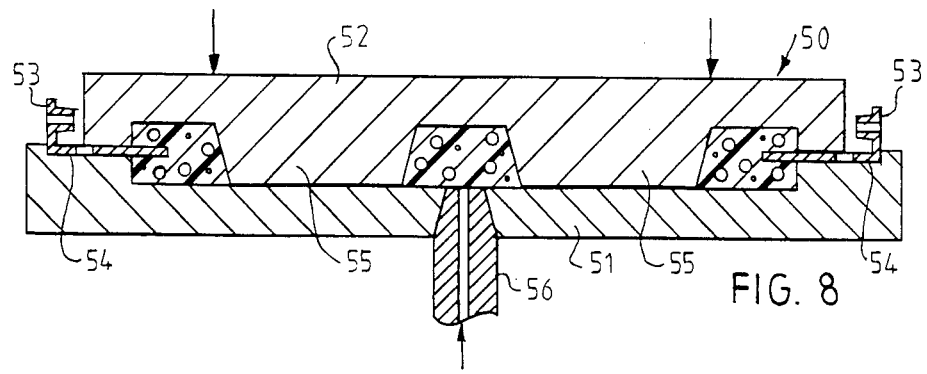
Figure 9:
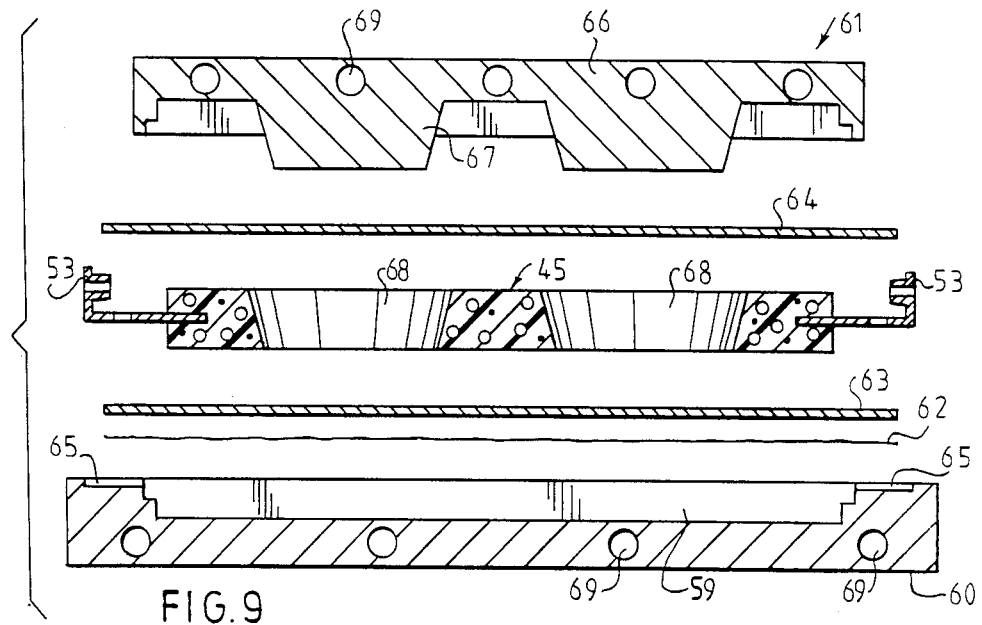
Figure 10:
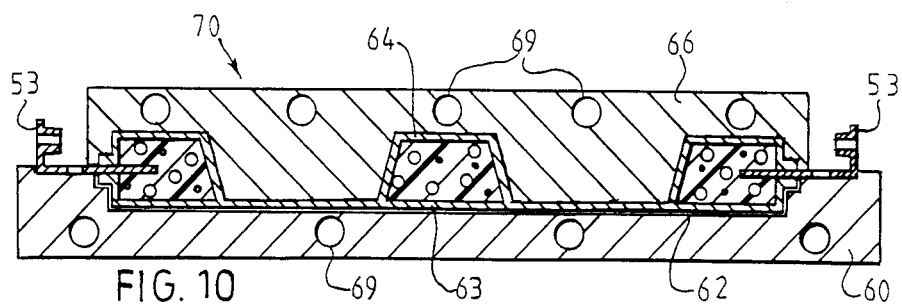

In the drawing in schematic form;

FIG. 1 and 5 each show a perspective view of a panel according to the invention, FIG. 2 shows on a larger scale the section II—II from FIG. 1, FIG. 3 shows on a larger scale the section III—III from FIG. 1, FIG. 4 is the section IV—IV from FIG. 1 on a larger scale, FIG. 6 shows on a larger scale the section VI—VI from FIG. 5, FIG. 7 is a perspective view of a prefabricated filling for a panel according to the invention, FIG. 8 shows a section through a mold for prefabricating the filling from FIG. 7, taken at the location of line VIII—VIII from FIG. 7, FIG. 9 and 10 show a section through a mold for manufacturing a panel with the prefabricated filling from FIG. 7 along the line VIII—VIII from FIG. 7 in open and closed position respectively, FIG. 11 is a top view of another panel according to the invention, and FIG. 12 shows a section along line XII—XII from FIG. 11.

The panel 1 in FIG. 1 is a reclining backrest for an automobile seat. This panel 1 consists substantially of a sandwich body 2 comprising two layers 3 and 4 of thermoplastic plastic, for example polypropylene (hereafter referred to as GMT) reinforced with long, randomly oriented glass fibres, and a filling 5 of foam plastic, for example polyurethane foam, located between them. Arranged around body 2 is a profiled edge 6 which consists exclusively of the fusing of two layers 3 and 4. Since at the edge 6 the deformations of the layers 3 and 4 are somewhat greater than at the location of the body 2, the required forming pressures are greater at the edge 6 during the pressing process. Between edge 6 and body 2 there is therefore a zone 7 with grooves 8 to effect a pressure reduction in the direction towards body 2, in order to prevent penetration of the GMT into the foam plastic of filling 5. As FIG. 2 shows, the edge 6 can have a sizeable cavity 9. Body 2 has a plurality of passages 10 of frustum conical form distributed over its surface. At each of these locations both layers 3 and 4 are fused to each other (FIG. 3). Created as a result is a strong, three-dimensional, "half-timbered" construction. Accommodated in edge 6 are metal insert elements 11, for example attaching bushes (FIG. 4).

With the panel 21 in FIG. 5 and 6 the edge 26 is molded on without an intermediate zone adjoining the sandwich body 2, while elongate passages 30 are thereby present in addition to round passages 31.

In a preferred embodiment of the method according to the invention a filling 45 (FIG. 7) is first prefabricated in a mold 50 as in FIG. 8, comprising a lower mold part 51 and an upper mold part 52. Metal insert elements 53 are thereby first placed in adapted cavities 54 of the lower mold part 51 prior to the upper mold part 52, which is provided with frustum conical cores 55, being pressed downward to close mold 50. The remaining form cavity of this mold 50 is then injection filled with foam plastic via a nozzle 56. After setting of this foam plastic the resulting filling 45 with molded on insert elements 53 is removed from mold 50.

In accordance with FIG. 9 a mold cavity 59 of a lower mold part 60 of a mold 61 is subsequently provided with a covering layer 62, for example of textile. Onto this is thereby laid a pre-heated layer 63 of GMT in plastic state. Placed in turn on this layer is the prefabricated filling 45, whereby the insert elements 53 are positioned in specially adapted recesses 65 of the lower mold part 60. A pre-heated layer 64 of GMT is then laid in plastic state onto the filling 45 following which an upper mold part 66 is moved downward with force to close the mold cavity 59 (FIG. 10), whereby frustum conical cores 67 penetrate into the passages 68 of filling 45 making layers 63 and 64 fuse with each other. Thus results a panel 70. Lower mold part 60 and upper mold part 66 are provided with fluid lines 69 in order to regulate the temperature of mold 61 with fluid at a set temperature. The panels 1, 21 and 71 shown in the other figures are also manufactured substantially according to this method.

FIG. 11 and 12 show a panel 71 consisting of two panel pieces 72 and 73, which are connected to each other for pivoting by means of a pivot element 74 consisting of a textile covering 75 running over both panel pieces 72 and 73. The two panel pieces 73 and 74 are manufactured simultaneously in one and the same mold in two adjoining mold cavities, whereby the covering layer 75 then extends into both mold cavities.

The metal insert elements referred to can be attaching elements for hinges, fixed elements or fastening points for seat belts, locking means and the like. The panel manufactured according to the invention has a great rigidity with a low weight and is therefore very suitable as automobile part.

It will be apparent that the panels according to the invention can be manufactured by both form pressing and flow pressing. The dimension of the reinforcing material permitting, an injection molding method can also be applied.

I claim:

1. The method of manufacturing an automotive panel such as a reclining backrest, loading floor, roof, door, engine hood, trunk lid and the like, which comprises the steps of prefabricating a filling of foamed plastic material defining contoured opposite side faces and having frusto-conical open areas within the peripheral confines thereof and extending between and to the opposite side faces of the filling, placing a first layer of fiber-reinforced thermoplastic material into conformity with an inner surface of the bottom half of a mold which has regions contoured similarly to one of the opposite side faces of the filling, placing one side surface of the filling onto a central region of the first layer, placing a central region of a second layer of fiber-reinforced thermoplastic material, compatible with the thermoplastic material of the first layer, onto the opposite side surface of the filling, closing a top half of the mold having regions contoured in accord with the opposite side surface of the filling onto the bottom half under pressure and while the layers are in plastic condition, one of the the top and bottom mold halves having frusto-conical projections reaching through the frusto-conical open areas, to fuse the first and second layers together around the peripheries of the central regions thereof and to each other through the open areas of the filling while intimately engaging the contoured regions of the mold halves against the layers and into contact with the filling.

2. The method as defined in claim 1, including the step of heating the first and second layers to plastic condition before placing such layers.

3. The method as defined in claim 1, including the step of providing the filling with metal attachment portions projecting outwardly from the peripheral confines thereof.

4. The method as defined in claim 1, including the step of exerting greatest pressure between the mold halves around the peripheral confines of the filling sufficient to deep draw the fused first and second layers and form a profiled edge surrounding the filling.

5. The method as defined in claim 4 including the step of embedding metal insert elements into the profiled edge.

6. A panel manufactured in accord with the method of claim 1.

7. The method of making a panel of light weight construction which comprises the steps of forming a core of foamed synthetic resinous material in a first mold so that the core is of skeletal configuration having contoured opposite side surfaces and frustoconical passages extending therethrough from one side to the other, sandwiching the core between sheets of synthetic resinous material within a second mold having frusto-conical internal projections and opposed surfaces conforming to the contours of the opposite side surfaces of the core, and intimately encapsulating the core with the sheets of synthetic resinous material within the second mold while fusing portions of the sheets together in marginally enclosing relation to the core.

8. The method as defined in claim 7 including the step of embedding metallic inserts into the core in the first mold and which project outwardly from the core.

9. The method as defined in claim 7 including the step of concentrating pressure on the sheets in the second mold in the regions thereof marginally surrounding the core and with force sufficient to provide a profiled edge around the margin of the core.

10. A panel manufacture in accord with the method of claim 7.

* * * * *